(12) United States Patent
Bienert et al.

(10) Patent No.: US 6,460,919 B2
(45) Date of Patent: Oct. 8, 2002

(54) SLIDING HEADLINER FOR A MOTOR VEHICLE ROOF WITH A HEADLINER PLATE PROTECTED AGAINST EJECTION

(75) Inventors: Horst Bienert, Gauting (DE); Roland Wittal, Munich (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/809,044

(22) Filed: Mar. 16, 2001

(65) Prior Publication Data

US 2001/0026084 A1 Oct. 4, 2001

(30) Foreign Application Priority Data

Mar. 16, 2000 (DE) .......................................... 100 12 770
Mar. 16, 2000 (DE) .......................................... 100 12 771

(51) Int. Cl.⁷ .................................................. B60J 7/00
(52) U.S. Cl. .................................. 296/214; 296/216.08
(58) Field of Search ................. 296/216.06–216.08, 296/214

(56) References Cited

U.S. PATENT DOCUMENTS

| 4,103,962 A | 8/1978 | Schlapp |
| 4,811,985 A | * 3/1989 | Kruger et al. ............... 296/214 |

FOREIGN PATENT DOCUMENTS

| DE | 3522047 A1 | 1/1986 |
| DE | 3534375 A1 | 4/1986 |
| DE | 19804144 C1 | 2/1999 |

* cited by examiner

*Primary Examiner*—Dennis H. Pedder
(74) *Attorney, Agent, or Firm*—Nixon Peabody LLP; David S. Safran

(57) ABSTRACT

A sliding headliner for a motor vehicle roof with a headliner plate (10) and reinforcements attached to it. The headliner is provided with reinforcements, such as belts. (18, 19) which run preferably above the headliner plate (10), which are separate from the headliner and its sliding elements (12, 13, 14, 15), and which laterally engage roof-mounted guides when upwardly loaded.

5 Claims, 3 Drawing Sheets

SLIDING HEADLINER FOR A MOTOR VEHICLE ROOF WITH A HEADLINER PLATE PROTECTED AGAINST EJECTION

BACKGROUND OF THE INVENTION

1. Field of the Invention

This invention relates to a sliding headliner for a motor vehicle roof for covering at least one openable cover which has a headliner plate and additional reinforcements attached to the sliding headliner.

2. Description of Related Art

Headliners for a motor vehicle roof are known, for example, from published German Patent Application DE 35 34 375 A1. To facilitate matching of the headliner plate to the roof headliner, the headliner plate in this motor vehicle roof is formed in two parts from a headliner body and a headliner plate frame which is securely joined to the headliner body. The headliner plate laterally engages roof-mounted guides via sliding blocks. One disadvantage of this motor vehicle roof and similar motor vehicle roofs having a guided headliner plate that slides is that the headliner plate cannot withstand the required ejection forces in the situations where stress from within the motor vehicle are applied to the headliner. Stress in this instance is defined as an accident scenario in which a passenger in the motor vehicle is thrown against the headliner plate. There are test specifications for motor vehicle manufacturers for the loads which occur in this case. The frame of the motor vehicle roof of German Patent Application DE 35 34 375 A1 which is provided with the headliner plate may only inadequately withstand such stress, if at all. This disadvantage also applies to other reinforcements of the headliner plate which are disclosed, for example, in the form of reinforcing strips in German Patent Application DE-A1 35 22 047.

SUMMARY OF THE INVENTION

The object of this invention is to devise a sliding headliner for a motor vehicle roof which ensures increased resistivity to ejection forces.

This object is achieved by the features described herein. Advantageous developments of the invention are set forth in the various embodiments.

In particular, the invention calls for a special retaining means for the headliner plate in order to be able to effectively withstand stress by ejection forces. The retaining means can be catch hooks, belts or struts which are independent of the actual sliding elements of the headliner plate, which run above or inside the headliner plate and laterally engage the roof-mounted guides. This assemblage of independent catch hooks, belts, reinforcing strips or struts and the roof-mounted guides can be easily designed such that each cooperates to keep the headliner plate securely in position so that the existing stress test specifications of the motor vehicle manufacturers are satisfied. More specifically, a desired deformation behavior or particularly specified bending stiffiess can be imparted to the belts or struts by choosing the material of the belts or struts as well as the dimensions and/or profile of the belts or struts in order to ensure the required resistivity of the headliner plate to ejection forces is achieved. Particularly, by the deformation behavior of the belts or struts, the retaining means can be matched to the stiffness of the openable cover which is made of sheet metal, plastic or glass, in order to oppose ejection forces with a maximum combined resistance and offer optimum passenger protection.

An additional embodiment of the sliding headliner constructed according to the invention, which is not to be underestimated, is that the stable retaining means provides additional protection against break-in to the motor vehicle via the sliding roof.

According to one particularly advantageous embodiment of the invention, the catch hooks, belts or struts of the retaining means are laterally connected to one another via sliding elements which run lengthwise of the sliding headliner, and due to the lengthwise dimension of the sliding element extending over a relatively long segment of the roof-mounted guides, ensures that the ejection forces acting on the belts or struts are applied to the roof-mounted guides and to the roof over as long a distance as possible.

In order to maximize the retention capacity of the retaining means which is formed of catch hooks, belts, reinforcing strips or struts, it is advantageous to provide the roof-mounted guides with additional second guides which are separate from the first guides used to hold the sliding elements.

According to one preferred embodiment, the belts or reinforcing strips of the retaining means for the headliner plate run perpendicular to the longitudinal side edges thereof. Preferably, there are at least two belts or reinforcing strips which are spaced apart from one another in the lengthwise direction and which are solidly joined to one another optionally by belts or cross struts running crosswise.

In the following, the invention is explained in detail by way of example using the drawings.

DETAILED DESCRIPTION OF THE INVENTION

The headliner plate 10 forms one component of a sliding headliner for a motor vehicle roof, which is not otherwise shown, for covering at least one openable cover which preferably is made of a transparent material, for example, a glass cover, and in the closed state closes a corresponding opening in the motor vehicle roof. One such motor vehicle roof is shown in German Patent Application DE 35 34 375 A1, the disclosure of which is hereby incorporated by reference into this application. In the closed position, the headliner plate 10 comes to rest congruently under the openable cover, and thus, prevents light from entering the passenger compartment of the motor vehicle.

Figure 2:
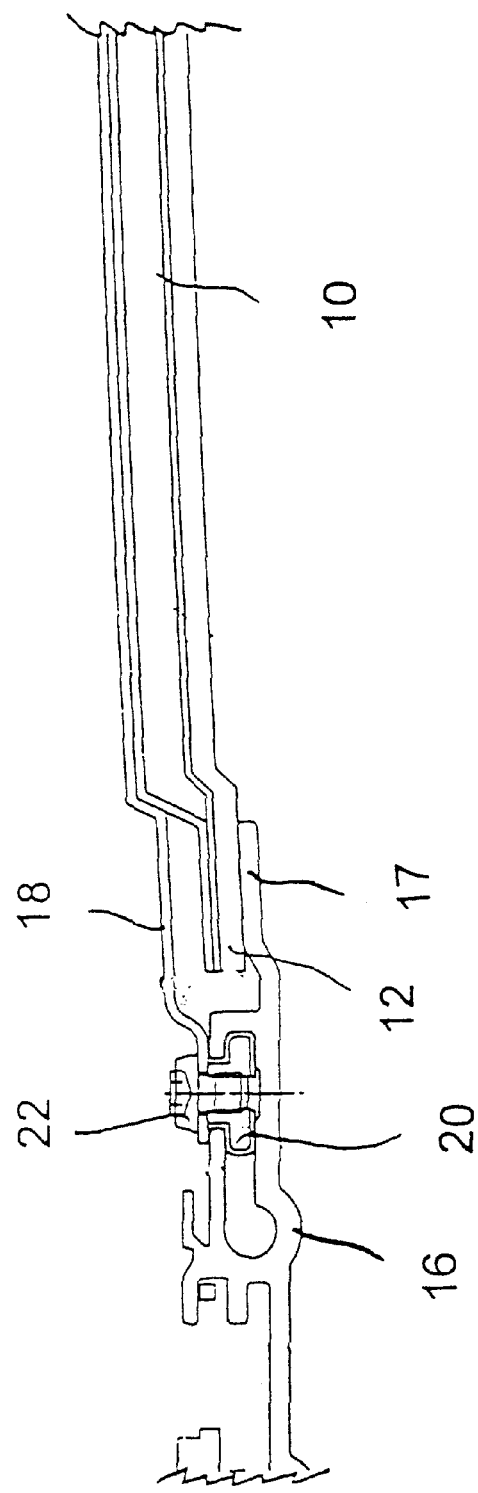
FIG. 2 shows a cross-sectional view along line X—X in FIG. 1 when installed on roof-mounted guide rails.

The headliner plate 10 can, for example, be actuated jointly with the glass cover in the conventional manner. Alternatively or additionally, the headliner plate 10 can be pushed by a motor or manually by the passenger or driver by reaching into a handle well 11 which is formed on the front edge of the headliner plate 10. Otherwise the headliner plate 10 is made as a profiled part with a peripheral, laterally deep-drawn edge, from which sliding elements 12, 13, 14 and 15 project laterally and are used for sliding guidance of the headliner plate 10 on lateral roof-mounted guide rails 16, one of which is shown in FIG. 2. The guide rail 16 interiorly has a brace 17 on which the sliding elements 12 and 13 at the edge of the headliner plate 10 rest in sliding relationship.

For the headliner plate 10 there is a retaining means in the form of two belts 18 and 19 which extend at a mutual distance transversely over the headliner plate 10 independently of it and preferably above it. The belts 18 and 19 are preferably made of steel or spring sheet metal, with their lateral ends projecting over the side edges of the headliner plate 10 and are securely joined to one another preferably by means of sliding rods 20 and 21 which run lengthwise of the headliner plate 10. According to one alternative embodiment not shown, the belts 18 and 19 are integrated into the material of the headliner plate 10. In this embodiment, the structure of the headliner plate comprises several layers with the belts 18 and 19 embedded between the layers, which can be pressed or laminated with the layers into an assemblage.

As follows from FIG. 2, each sliding rod 20 and 21 has an outside profile which is made complementary to a groove in the guide rail 16 in which the sliding rod 20 and 21 can move lengthwise. FIG. 2 also shows that the belt 18 is screwed to the sliding rod 20 by means of a screw 22 which penetrates a hole in the end of the belt 18 and via a thread fits into the inside thread of the sliding rod 20. Since the sliding rods 20 and 21 extend over nearly the entire length of the headliner plate 10, ejection forces, which act from underneath against the headliner plate 10 and thus on the belts 18 and 19, are applied over nearly the entire length of the sliding rods 20 and 21 to the guide rails 16 which are permanently connected to the motor vehicle roof. This results in an assembly comprising the headliner plate 10 and belts 18 and 19, which when subjected to ejection forces acting in the bilateral guide rails 16, are able to at least withstand the maximum stress established by the existing test specifications of motor vehicle manufacturers.

The configuration of the belts 18 and 19 can control their bending stiffness in order to ensure the maximum possible resistance to ejection force for the combined system consisting of the belts and the glass cover. By choosing the corresponding material, thickness, and shape of the belts 18 and 19, controlled deformation of the headliner during a crash can be adjusted which increases passenger protection.

Figure 3:
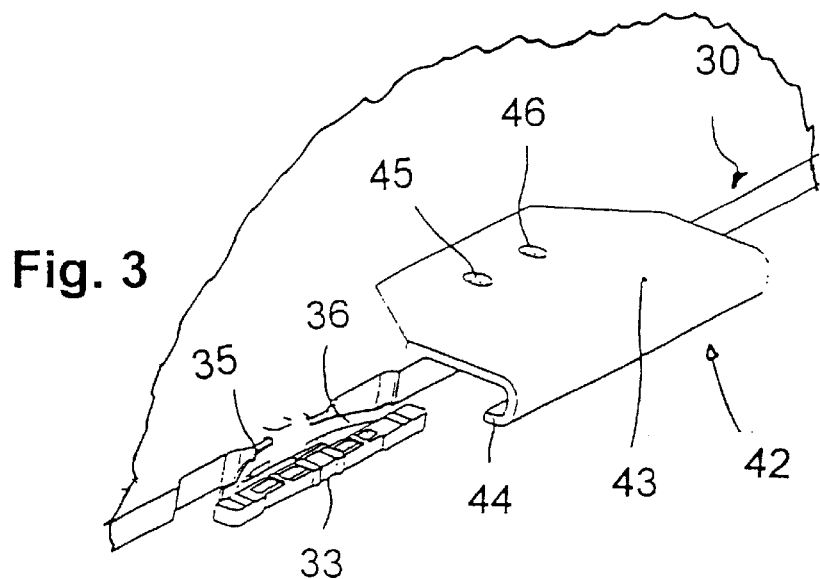
FIG. 3 shows a perspective partial view of one edge of the headliner plate of a motor vehicle roof provided with catch hooks of the invention.
Figure 4:
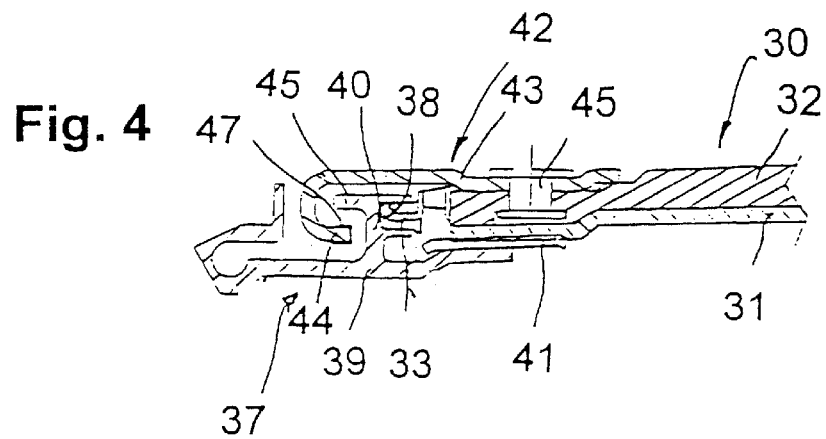
FIG. 4 shows a cross-sectional view of the arrangement formed of a headliner plate and the catch hooks of the arrangement from FIG. 3.
Figure 5:
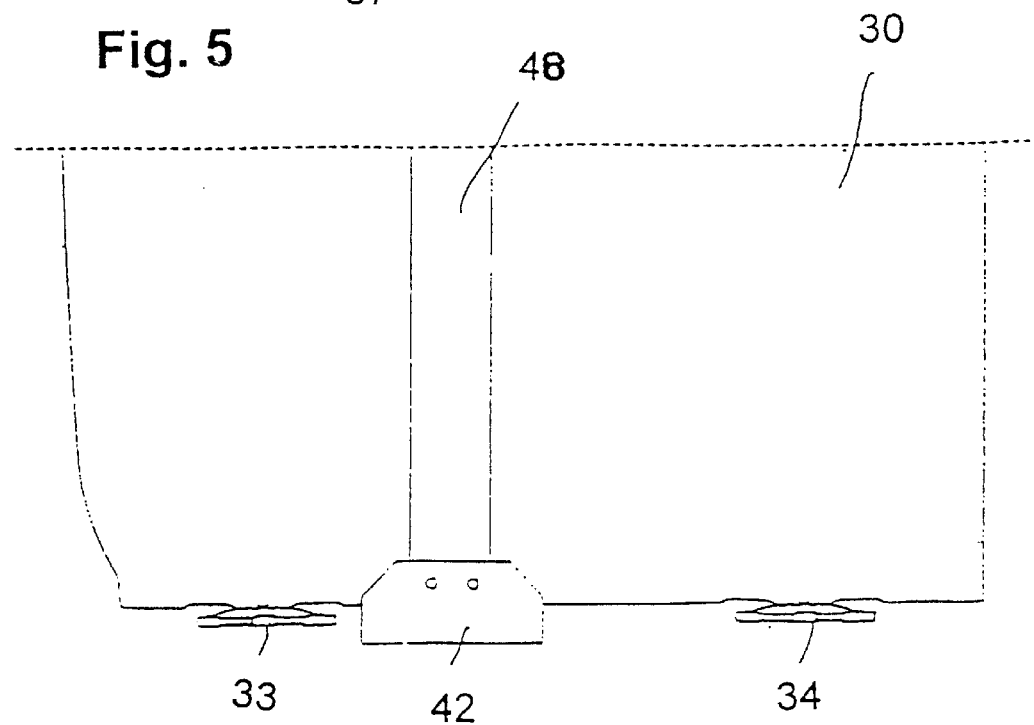
FIG. 5 is a partial overhead view of a headliner plate which is provided with catch hooks on the edge side and which additionally has a reinforcing strip between the two catch hooks which are opposite one another.

In another embodiment as shown in FIGS. 3, 4, and 5, the headliner plate of the sliding headliner of a motor vehicle roof which is shown here but which is known from the previously mentioned DE 35 34 375 A1 is generally labeled 30. As follows from the cross sectional view from FIG. 4, the headliner plate 30 is formed preferably in two parts from two different materials, for example, a plastic plate 32 with an underlying material lamination or coating 31. Along the two side edges the headliner plate 30 there are several sliding elements, of which FIG. 3 shows the sliding element 33 on one edge of the headliner plate 30 and FIG. 5 shows two such sliding elements 33 and 34. These sliding elements 33, 34 can be made in different embodiments. In this embodiment, the sliding element 33 is connected via spring arms 35, 36 to the headliner plate 30. The sliding elements 33, 34 which are located along the side edges of the headliner plate 30 run in guide grooves 38 which are securely joined to the roof via guide rails 37 for the headliner plate 30 on either side of the roof opening. With respect to guide rails, FIG. 4 shows a guide rail 37 which has a guide groove 38 which is open in the direction of the headliner plate 30 and into which the sliding elements 33 and 34 fit. The guide rail 37 has a relatively complex profile with a lower brace 39 which runs roughly flat and from which a T-shaped brace 40 projects upward, with a cross beam which forms the top wall of the guide groove 38 on the side located inward to the headliner plate 30.

On the inner edge of the guide rail 37 there is a cover frame 41 which is made in the form of flat material, particularly of plastic, which is attached on the top of the lower brace 39 in its inside edge area over the entire periphery of the roof opening and on which the headliner plate 30 slides with its lamination 31. The cover frame 41 can also be made as a weatherstripping edge. It is also conceivable for the headliner plate 30 to run with its lamination or coating 31 directly on one edge of the guide rail 37.

In this respect this arrangement of the headliner plate and the guide elements corresponds to the prior art.

Special retaining measures for the headliner plate 30 relative to the motor vehicle roof are disclosed. These measures comprise catch hooks 42 which are located on either side of the headliner plate 30 and are connected securely to it. The catch hooks 42 act with retaining rails which are located securely on the motor vehicle roof for application of the force to the fixed roof.

There are at least two catch hooks 42, with at minimum there being one catch hook 42 on each side of the headliner plate 30. Preferably, there are at least two catch hooks 42 opposite one another arranged in pairs on each side of the headliner plate 30. Of these pairs of catch hooks, FIGS. 3, 4 and 5 each show only one of the catch hooks 42. The catch hooks 42 are elements made of deformation-resistant, fracture-resistant, flat material, for example, a strip of sheet steel, which in cross section has a U-shape with legs of different length. The long leg 43 of the catch hook 42 is connected to the headliner plate 30 via rivets 45 and 46. The rivets 45 and 46 penetrate the plastic plate 32 and thus establish a stable, tear-resistant connection between the catch hooks 42 and the headliner plate 30.

The short leg 44 of the catch hook 42 fits around the T-beam part 45 of the T-shaped brace 40 of the guide rail 37, i.e., the part which extends to the outside, without contact in normal operation. The T-beam part 45 forms a component of the retaining rail of the retaining system for the headliner plate 30. In this instance, the retaining rail is formed as an integral part of the guide rail 37. Alternatively, the retaining rail can also be made as a part separate from the guide rail 37 in a manner not shown. Suitable profiling of the guide rail 37 ensures the required stability of the retaining rail part for the retaining system of the invention.

While the catch hooks 42, in normal operation, runs without contact and without any function along the retaining rail, for example, along the T beam part 45, the catch hooks 42 adjoin the T beam part 45 of the guide rail 37 such that, when the headliner plate 30 is deformed under stress by ejection forces, the headliner plate 10 is retained by means of the catch hooks 42 and the retaining rails. The retaining system as embodied in the headliner plate 30 thus represents an important safety element in the case of an accident, which without this retaining system and with the sliding roof open under extremely unfavorable conditions could pose the danger that a passenger or the driver would strike the headliner plate 30 with their head and tear the headliner plate 30 out of the guide rail.

To support the retention capacity of the headliner plate 30 itself, the two catch hooks 42 which are opposite one another can be securely connected to one another by a reinforcing strip 48 which is shown in FIG. 5 in an overhead view. This reinforcing strip 48 can be made of steel, textile or plastic strip material and optionally represents an integral component of the two catch hooks opposite one another. The reinforcing strip 48 can run over the top of the headliner plate 30 or for a multi-layered structure of the headliner plate 30 can be integrated into the headliner plate 30.

Figure 1:
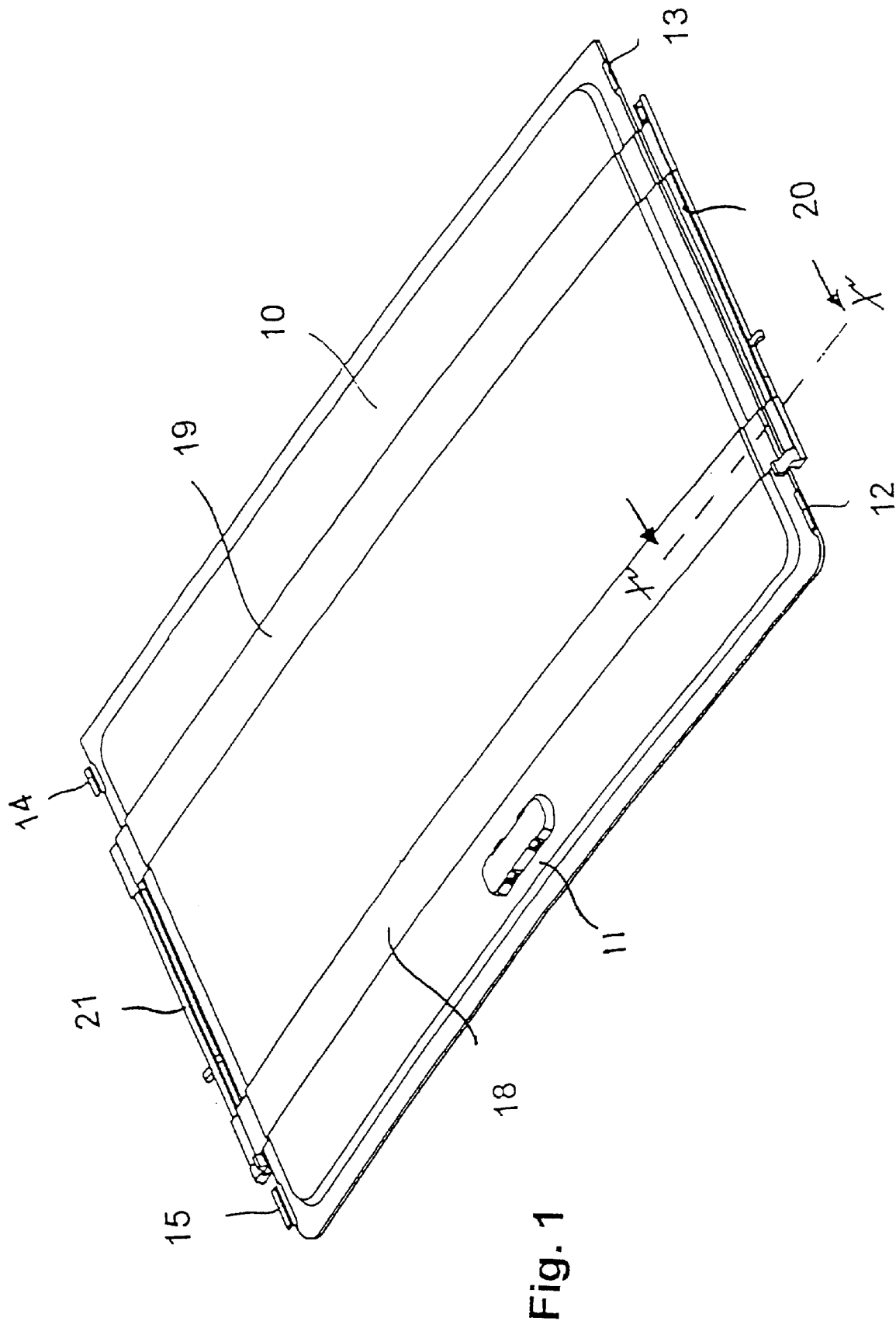
FIG. 1 shows an plan view of a headliner plate which is provided with a retaining means.

The catch hook 42 on its short leg 44 is preferably provided with a felt strip 47 or similar material in order to prevent possible clattering. As in the first embodiment, as shown in FIGS. 1 and 2, the catch hooks 42 can also be connected via reinforcing or sliding rods which run parallel to the side edges of the headliner plate 30.

It is a common feature of the two embodiments shown in FIGS. 1 and 2 or FIGS. 3 to 5, that crash safety is provided independently of the actual guides and sliding elements of the headliner plate 10 and 30 which greatly increases the ejection forces necessary to force the headliner plate out of the guides during a crash.

What is claimed is:

1. Sliding headliner for a motor vehicle roof comprising a headliner plate which is movably guided on roof-mounted guides via sliding elements and additional retaining elements, the retaining elements being one of catch hooks, belts, and reinforcing strips that run above the headliner plate, are separate elements from the headliner plate and all sliding elements upon which the headliner plate is guided during normal operation of the roof, and which laterally engage roof-mounted retaining guides upon upward loading of the headliner plate.

2. Sliding headliner as claimed in claim 1, wherein the retaining guides comprise a sliding guide at each side of the headliner plate which runs lengthwise of the headliner plate; and wherein said retaining elements are attached to the sliding guide on each side of the headliner plate.

3. Sliding headliner as claimed in claim 1, wherein each roof-mounted guide has a second guide for laterally engaging the retaining elements; wherein said additional second guide is separate from first guides for holding the sliding elements of the headliner plate.

4. Sliding headliner as claimed in claim 2, wherein the retaining elements impart a deformation behavior to the headliner to resist ejection stress applied thereto as a result of at least one of the profile, the material, and the dimensions of the retaining elements.

5. Sliding headliner for a motor vehicle roof comprising a headliner plate which is movably guided on roof-mounted guides via sliding elements and additional retaining elements, the retaining elements being one of catch hooks, belts, and reinforcing strips that run above the headliner plate, are separate elements from the headliner plate and the sliding elements, and which laterally engage roof-mounted retaining guides upon upward loading of the headliner plate and; wherein the retaining elements are one of belts and reinforcing strips and run perpendicularly to lengthwise side edges of the headliner plate.

* * * * *

UNITED STATES PATENT AND TRADEMARK OFFICE
Certificate

Patent No. 6,460,919 B2                                                   Patented: October 8, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Horst Bienert, Gauting, Germany; Roland Wittal, Munich, Germany; Alexander Bergmiller, Augsburg, Germany; Norbert Elbs, Munich, Germany; Bernd Schleicher, Munich, Germany; and Markus Schwarz, Titisee-Neustadt, Germany.

Signed and Sealed this Second Day of December 2003.

D. GLENN DAYOAN
*Supervisory Patent Examiner*
*Art Unit 3612*